United States Patent [19]

Kramer

[11] 4,259,992
[45] Apr. 7, 1981

[54] FLEXIBLE PIPE SECTION

[75] Inventor: Hendrikus Kramer, Voorschoten, Netherlands

[73] Assignee: Vredestein N. V., Netherlands

[21] Appl. No.: 74,366

[22] Filed: Sep. 10, 1979

Related U.S. Application Data

[63] Continuation-in-part of Ser. No. 879,918, Feb. 22, 1978, abandoned.

[30] Foreign Application Priority Data

Feb. 23, 1977 [NL] Netherlands ................. 7701963

[51] Int. Cl.³ ............................................. F16L 11/08
[52] U.S. Cl. ..................................... 138/138; 138/36; 138/103; 138/104; 138/109
[58] Field of Search ................. 138/36, 103, 104, 109, 138/132, 133, 138, 139, 153, 172, 174, 120; 285/149

[56] References Cited

U.S. PATENT DOCUMENTS

| | | | |
|---|---|---|---|
| 132,006 | 10/1872 | Harris | 138/138 X |
| 398,425 | 2/1889 | Midgley | 138/133 |
| 418,696 | 1/1890 | Dean | 138/139 |
| 663,570 | 12/1900 | Haviland et al. | 138/139 |
| 947,046 | 1/1910 | Sugg | 138/138 |
| 1,068,491 | 7/1913 | Synon | 138/133 |
| 1,847,218 | 3/1932 | Lamb | 285/149 |
| 1,939,872 | 12/1933 | Bedur | 138/133 X |
| 2,146,218 | 2/1939 | Kimmich et al. | 285/149 |
| 2,210,833 | 8/1940 | Clough | 138/138 |
| 2,220,785 | 11/1940 | Goodall | 285/149 |
| 2,277,397 | 3/1942 | Graham | 138/133 X |
| 2,854,030 | 9/1958 | Schulthess | 138/138 X |
| 2,911,236 | 11/1959 | Thibault | 138/138 X |
| 2,940,778 | 6/1960 | Kaiser | 285/149 X |
| 3,318,620 | 5/1967 | Cullen et al. | 285/149 |
| 3,453,008 | 7/1969 | Lejeune | 138/109 X |
| 4,157,101 | 6/1979 | Ross | 138/138 |

FOREIGN PATENT DOCUMENTS

| | | | |
|---|---|---|---|
| 792388 | 12/1935 | France | 138/138 |
| 109774 | 9/1917 | United Kingdom | 138/139 |
| 573011 | 11/1945 | United Kingdom | 138/120 |

Primary Examiner—James E. Bryant, III
Attorney, Agent, or Firm—Karl W. Flocks

[57] ABSTRACT

A flexible pipe section for the transportation of a mixture of water and solid material, such as pieces of stone, rock, metal and the like objects having sharp points and/or edges and/or projections offering a high resistance to wear and damage in that the wall of the pipe section lying between couplings at the ends of said pipe section, in order to lengthen its life, comprises a row of abrasion-resisting annular members spaced from each other and extending substantially in between the inner and outer surfaces of the wall of the pipe section and inclined at a sharp angle with the longitudinal axis of said pipe section, a tubular cover of elastic material on the pipe section including said wall, said cover having at least one insert serving to prevent as much as possible tension occurring in the layers of rubber or elastic material connecting said members.

1 Claim, 2 Drawing Figures

FLEXIBLE PIPE SECTION

This application is a continuation-in-part of Ser. No. 879,918, filed Feb. 22, 1978, now abandoned.

BACKGROUND OF THE INVENTION

The invention relates to a flexible pipe section for the transportation of a mixture of water and solid material, in which pieces of stone, rock, metal and such objects with sharp points and/or edges and/or projections are present, and aims at lengthening the life of a flexible pipe section of this kind, destined especially for dredging purposes.

SUMMARY OF THE INVENTION

This aim is reached with the flexible pipe section according to the invention in that the part, which lies between the ends thereof, including a row of abrasion-resisting annular members which are spaced from each other and extend substantially in between the inner and outer surfaces of the pipe section and are inclined at a sharp angle with the longitudinal axis of the pipe section. The inclined sides of adjacent abrasion-resisting members are connected with each other by means of a layer of elastic material such as rubber or elastic synthetic material. Each of the abrasion-resisting members may consist of one truncated piece or of a number of pieces, each having essentially the shape of a ring or a truncated conical shell. In the case of a number of pieces, these pieces may consist of parts or strips of a ring or of a truncated conical shell. The edges of the parts or strips overlap each other and are included at a sharp angle with the longitudinal axis of the pipe section and form a truncated conical shell. As the abrasion-resisting members are connected with each other by an intermediate layer consisting of rubber or of an elastic synthetic material, an elastic and flexible entirety is obtained.

An advantageous embodiment of the flexible pipe section is characterized in that the abrasion-resisting members form a sharp or small acute angle with the axis of the flexible pipe section in the direction of flow of material. When the flexible pipe section is taken into service, it must be assured that the inclination of the abrasion-resisting members is directed in the direction of the flow of the material. Thus it is obtained, that the flow resistance is as small as possible, as the material being transported cannot collide with the head edges of these members and will not penetrate between the members.

According to the invention, this flexible pipe section may be surrounded by a tubular sheath of rubber or of an elastic synthetic material, in which one or a number of inserts is provided, which avoid an axial prolongation of the flexible pipe section. Of course, this sheath also provides a reinforcement, which counteracts a radial expansion of the flexible pipe section, so that extra high over-pressures can be worked under, since the metal links already offer such a reinforcement of the wall, that it can withstand relatively high overpressures.

According to the invention, each of the ends of the flexible pipe section may be provided with a flange having a metal coupling part, which is connected by means of a layer of rubber or elastic synthetic material with the adjacent abrasion-resisting member. According to the invention, the wall which is directed away from the flange, of the metal coupling part is parallel or almost parallel to the adjacent abrasion-resisting member. It is observed that it is already generally known from, e.g. the U.S. Pat. Nos. 132,006 (1872), 418,696 (1890), 663,570 (1900), 947,046 (1910) and 1,068,491 (1913), the British Patent No. 109,774 (1917, the French Pat. No. 792,388 (1935) and many other literature sources to provide the inner wall of an elastic pipe section of rubber or other elastic material with abrasion-resisting cylindrical and other members in order to protect said rubber pipe section against the wear of the material transported therethrough and/or to reinforce the wall of said pipe section. However, when used against wear, said members are provided in such a way that they form a lining or covering of the inner wall of said rubber pipe section in such a way that it covers substantially said entire inner wall. In consequence of said arrangement of the abrasion-resisting members, substantially their entire inner surface is exposed to the wearing action of the transported material, so that the entire inner surface layer of the abrasion-resisting members substantially wear equally in cross-sectional direction. In contradiction thereto, according to the invention, due to the arrangement of the abrasion-resisting members, as described above, due to their inclined embedded position, only said end portions of the abrasion-resisting members lying at the inside of the pipe section are exposed to the wearing action of the transported material so that exclusively said end portions and the elastic material between said end portions may be worn away in the longitudinal direction of said members.

In consequence, said wearing away takes place little by little, since before the preceding end portios of the abrasion-resisting members are worn away, the portions of said member lying behind said preceding end portions cannot come into contact with the transported material.

It is furthermore observed that it is already known from the British Pat. No. 573,011 to provide a flexible pipe with spaced, coaxial, rigid washers and interposed, coaxial, rubber members or washers bonded on both faces to adjacent rigid members or washers. However, said washers are arranged on the outside of the flexible pipe so that they are only exposed to a wearing action of the material transported by said pipe after the rubber link is worn away. Said washers serve as reinforcement to improve said flexible pipe in such a way that it can carry hydraulic fluid at high pressure, i.e. a heavy-duty pipe. In contradiction thereto, as already mentioned, according to the invention said members are provided in such a way that they extend substantially in between the inner and outer surface of the pipe section and are inclined at a sharp angle with the longitudinal axis of the pipe section so that only the inner end portion of said members come into contact with the transported material so that by said special arrangement the life time, as described above, of said pipe section is lengthened.

BRIEF DESCRIPTION OF THE DRAWINGS

The invention will be explained hereinafter with reference to the drawings, in which, by means of example, two embodiments of a flexible pipe section are shown.

IN THE DRAWINGS

Figure 1:
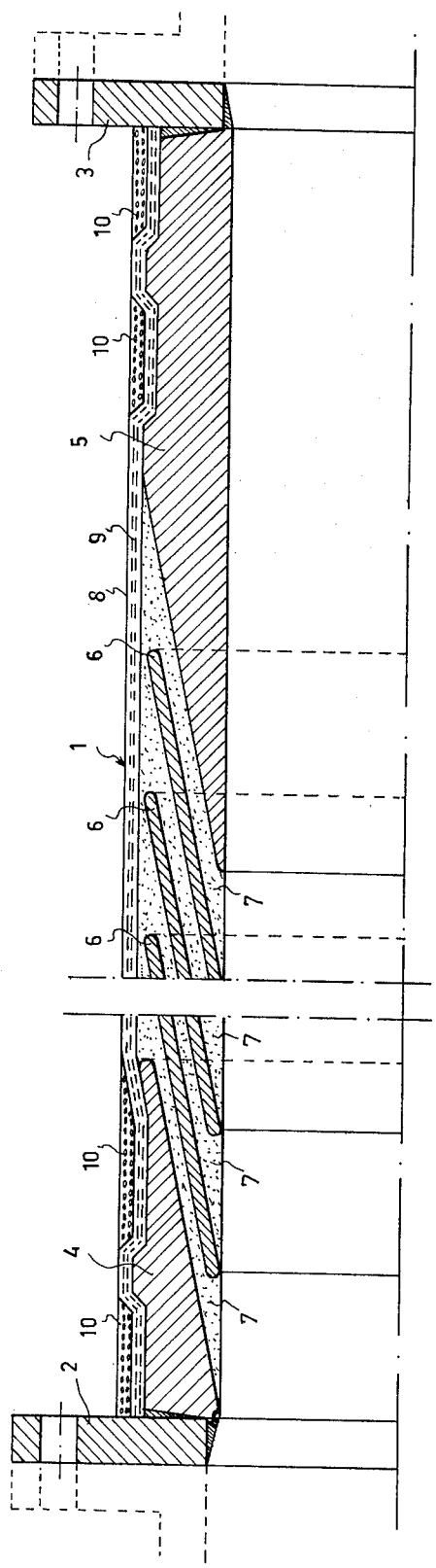
Figure 2:
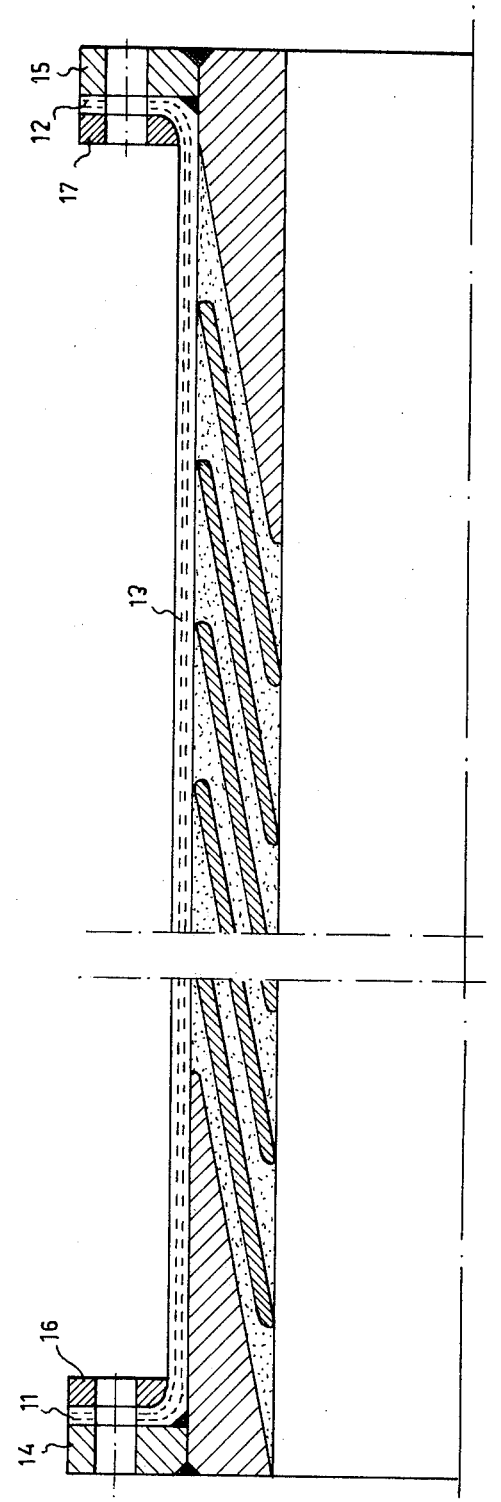

FIG. 1 shows a longitudinal section of a part of a flexible pipe section according to the invention;

FIG. 2 shows a partial longitudinal section of a part of another embodiment of the ends of a flexible pipe section according to the invention.

DESCRIPTION OF THE PREFERRED EMBODIMENTS

The flexible pipe section shown in FIG. 1 consists of a tubular middle section 1, the ends thereof being formed by flanges 2 and 3, respectively, each of which has a coupling part 4 and 5 respectively.

Between the coupling parts 4 and 5 there are metal annular abrasion-resisting members 6, which have the shape of the periphery of a truncated cone. These members 6 are connected with each other by intermediate layers 7 of rubber or of an elastic synthetic material. Thus a flexible pipe section is obtained, which is elastically flexible. As the members 6 are embedded completely in the rubber or in the elastic synthetic material 7, the risk is excluded that in case of wear in the flexible pipe section, the annular parts might enter into the pipe section. Between each of the coupling parts 4 and 5 and the adjacent members 6 there is also a layer of rubber or elastic synthetic material, which is vulcanized to these coupling parts and members, so that a firm entirety is obtained.

Although FIG. 1, and also FIG. 2, show members 6 fully embedded in rubber or elastic synthetic material 7, it is not necessary that they be fully embedded in material 7. Actually after some use, whether or not the end portions of the members 6 start out embedded fully, the sharp material passing through the pipe will wear away this softer material exposing ends of members 6 to the abrasive material flowing through the pipe. It is for this reason that members 6 themselves are of a material having a high resistance to wear, such as a harder form of metal.

The rubber or elastic synthetic material 7 should be formed at least between overlapping portions of links 6 and even in the case of wearing away of inner end portions of the softer material 7, by abrasive material transported through the tube, the protection afforded by members 6 should cause the majority of the material 7 to remain with some wearing out at the inner end of the members 6 where the abrasive material passes. The sharpness of the angle and amount of overlap of members 6 would to an extent be dependent on the material to be transported through the pipe. It should be noted that members 6, as used in this invention, can only in the radical direction of the tube partially overlap since full overlap of members 6 would not allow them to be positioned along the length of the pipe section as illustrated in the figures. For best protection of filler material 7 against wearing away at the inner tips of members 6, members 6 should cover the major portion of intermediate layers of rubber or elastic synthetic material 7 by having major portions of members 6 overlapping.

Around the elastic pipe section is provided a tubular sheath 8. In the longitudinal direction of the sheath-wall, inserts 9 are provided therein, which consist of fabric, metal wires or other reinforcements. This sheath serves to prevent as much as possible an axial elongation of the elastic pipe section, in order to prevent tension occurring in the layers 7 of rubber or synthetic material, which connect the members 6 with each other and with the coupling parts 2 and 3, which tension might involve the damage of the elastic pipe section.

By a helicoidally steel cord 10 wound around the ends of the sheath 8, these ends are connected firmly with the coupling pieces.

The elastic pipe section according to the invention is manufactured by placing on the coupling piece 5 a layer of unvulcanized rubber and by pressing on this layer a member 6, which consists of one single piece, or of a number of pieces. Then subsequently a layer 7 of unvulcanized rubber and a metal member 6 and finally the coupling part 4 are placed against the last rubber layer 7.

Then the sheath 8 of unvulcanized rubber 8 is placed around the thus manufactured pipe section, whereafter the whole is vulcanized. Before applying the rubber layers, the metal surfaces in question can be provided with an adherent known per se, whereby a better adhesion of the rubber to the metal parts is obtained.

The embodiment shown in FIG. 2 of the flexible pipe section according to the invention distinguishes itself from the one according to FIG. 1, in that the end parts 11 and 12 respectively of the sheath 13 are directed radially outwards and lie with their one side against the flanges 14 and 15 respectively. Against the other side of these radially outward directed end parts 11 and 12 lies a ring 16 and 17 respectively.

As in the embodiment according to FIG. 1, this sheath is placed in unvulcanized state around the not yet vulcanized remaining part of the elastic pipe section, whereby all parts of this pipe section are firmly connected with each other by vulcanization. As in the preceding embodiment, an elastic synthetic material can be used instead of rubber.

It will be obvious that the invention is not restricted to the embodiment as described above and as shown in the drawing, but that it can be modified in numerous ways without leaving the scope of the invention.

I claim:

1. A flexible pipe section comprising
   coupling means at each of the ends of the flexible pipe section,
   a wall of the pipe section lying between said coupling means including
      a row of abrasion-resisting annular members spaced from each other and extending substantially in between the inner and outer surfaces of the pipe section and inclined at a sharp angle with the longitudinal axis of the pipe section,
      a layer of elastic material between and connecting inclined sides of adjacent annular members, said annular members having the shape of a shell of a truncated cone, having an axis substantially coinciding with the axis of the pipe section and having overlapping portions of adjacent annular members extending such that any plane transverse of said pipe section between said coupling means passes through at least two of said annular members,
   a cover of elastic material on the pipe section including said wall,
   at least one insert means in said cover to counteract an axial elongation of said cover,
   end portions of said pipe section being secured to said coupling means.

* * * * *